Sept. 28, 1937.    L. COHEN    2,094,486
REVOLVING APPAREL TREE
Filed March 25, 1936
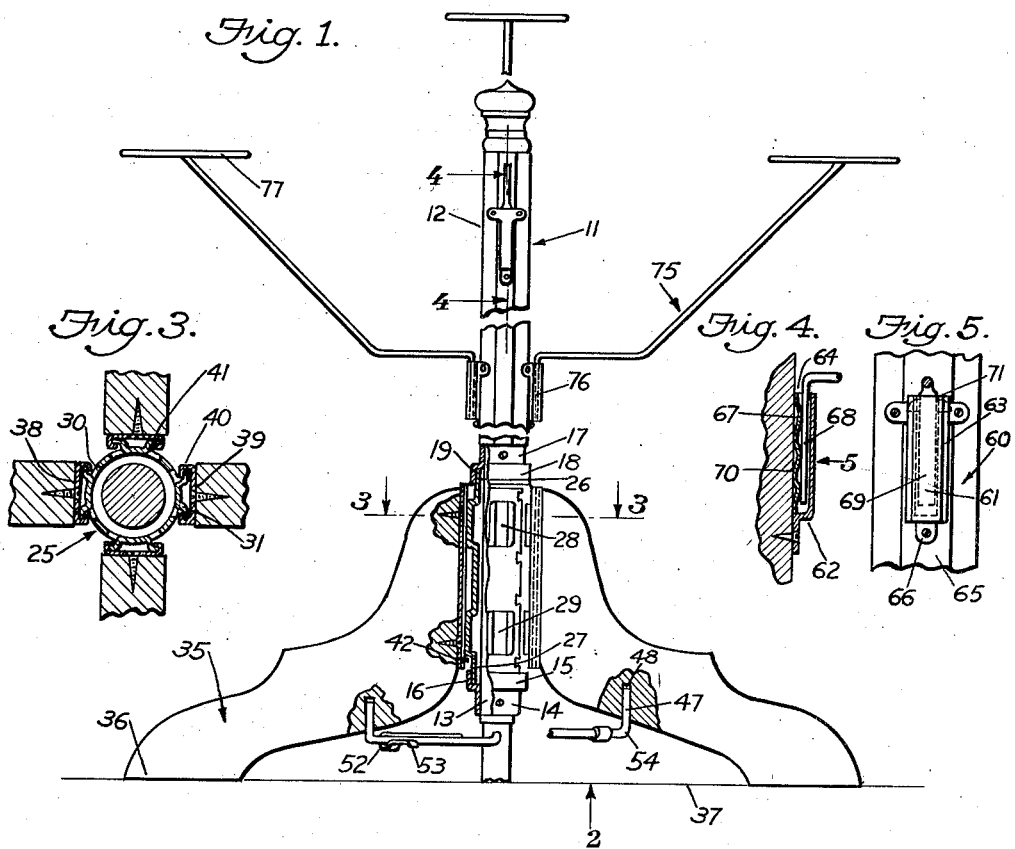
Inventor
Leon Cohen
by Hazard and Miller
Attorneys Patented Sept. 28, 1937

2,094,486

UNITED STATES PATENT OFFICE 2,094,486

REVOLVING APPAREL TREE

Leon Cohen, Downey, Calif.

Application March 25, 1936, Serial No. 70,831

6 Claims. (Cl. 248—165)

My invention relates to improvements in a dismountable type of revolving apparel tree in which there is an upright stand or column to which arms are attached for holding or suspending garments, and the stand is provided with legs at the bottom for resting on the floor.

In this type of invention one of the objects and features thereof is to mount the post or stand in the legs so that while the legs are stationary as to a floor, the post or stand may revolve and thus make it convenient to display garments or similar articles and to place them on or remove them from the stand.

Another feature relating to the connection of the legs to the stand is in providing a slidable connecting element between each of the legs and the stand so that the legs may be disconnected from the stand to facilitate shipment. Another detail is in providing a post stop or abutment nub to regulate the lowermost position of the stand in reference to each leg. A further feature consists in providing a sliding adjustment for each leg as to the stand to accommodate the legs to a slight uneven surface of a floor; thus while, for instance, one of the legs may have the stand contact the abutment nub and one or more of the other legs may be depressed with the nub below the shoulder with which it engages. A further feature is in angle braces securing the legs the proper spaced distance apart, such legs being radial to the stand and having braces of a disconnectible type to facilitate shipping. Another detail of the construction involves the rotatable bearing for the stand in which collars secured to a wooden post or stand engage a metal sleeve which is used to form the slip connection to the legs.

Another detailed feature of my invention relates to a socket construction for holding arms, brackets, or the like, on which garments are supported. This has a frictional holding device for a plug, such plug forming part of an arm or bracket, and the friction device being made in the manner of a so called marcel or wavy spring.

My invention is illustrated in connection with the accompanying drawing in which Figure 1 is an elevation of my invention with portions of the legs and lower part of the stand broken away to illustrate details.

Figure 2 is a bottom plan taken in the direction of the arrow 2 of Figure 1.

Figure 3 is a horizontal section on the line 3—3 of Figure 1 in the direction of the arrows through the adjustable friction attachment of the legs to the stand.

Figure 4 is a detail vertical section on the line 4—4 of Figure 1 showing the friction socket for attaching brackets.

Figure 5 is a detail elevation taken in the direction of the arrow 5 of Figure 4.

In my invention I employ a post or stand 11 in which the upper portion 12 may be of considerable heighth for conveniently placing articles on brackets or the leg. The lower portion 13 is preferably reduced in diameter and usually it is preferable that this be cylindrical. A lower collar 14 is attached to the bottom part of the stand. This collar has an offset shoulder 15 so that the upper part forms an annular recess 16 between the upper part of the collar and the lower cylindrical or reduced part of the post or stand. There is a similar collar 17 also secured to the lower part of the stand but in this case the rim portion 18 extends downwardly leaving an inner annular space 19.

A metal sleeve designated by the assembly numeral 25 is preferably cylindrical and of such diameter that the upper and lower ends 26 and 27 fit in the annular spaces 16 and 17, the collars 15 and 17 thereby forming bearings for the sleeve. The sleeve is generally made of steel and the collars of a softer metal such as brass to develop wheeling qualities. The sleeve is preferably formed with upper and lower pairs of guide fingers 28 and 29. Each of these is formed by cutting slits in the metal of the sleeve and placing the metal adjacent the slits outwardly as indicated at 30 (note Figure 3). This forms two opposite fingers projecting outwardly from the cylindrical section of the sleeve. The side edges 31 of the fingers are parallel and are thus parallel to the center of the post. It is sufficient to have an upper and lower set of these fingers to get a proper attachment for the legs.

In the construction shown there are four legs designated by the assembly numeral 35. These have feet 36 to rest on a floor indicated at 37 and each have for a vertical edge 38. Attached to such edge there is a metal guide strip 39 having bent over marginal edges 40 leaving an opening 41 between the parallel edges. This forms in effect dove tailed metal guides on the vertical edge of each leg. These guides accommodate the pairs of fingers 28 and 29 which are formed integral with the sleeve 25, the fingers being inserted at the uppermost end of each of the guides. This allows the guides to be thrust upwardly on the post until a stop nub 42 on each leg engages the lower edge of the lower sets of fingers 29. This nub is preferably formed by making a small slit in the metal of the guides and pressing the slit portion outwardly. It is preferable to construct the fingers and the guide groove devices to have a rather tight frictional fit however the nubs limit the downward movement of the post in reference to the legs.

In order to maintain the legs properly spaced and allow for a slight vertical adjustment as hereinunder detailed spacing bars 45 are utilized. These bars have a horizontal portion 46 and vertical ends 47 which fit in sockets 48 formed on the underside of each of the legs, these sockets extending up from the under edge 49. It will be noted that there are two of these spacing bars connecting two adjacent legs and thus extending diagonally between such legs. There are also spacing straps 50 of which two are employed, these having a straight strap section 51 and eyes 52 formed by bending the end portions 53 over the bar sections 46. As the spacing straps are made of spring metal the eyes are resilient so that the free ends may be readily pressed open to fit the straps over the bars 46. These are preferably thrust outwardly to fit adjacent the angles 54 formed by the horizontal bar section 46 and the outwardly extending ends 47.

One of the purposes of this design in having the legs disconnectible from the post and utilizing the spacing devices is for convenience of manufacture and shipment as the apparel tree may be shipped in a disassembled condition and then assembled by the purchaser. Another object of having the legs slidably connected to the sleeve is to provide for a slide adjustment should a floor be uneven or be out of the horizontal when it is desired to have the stand or post vertical. In some cases these apparel trees are used in store windows to exhibit merchandise and in some cases the floor behind the window slopes towards the window, in which case for instance, one of the legs is thrust upwardly on the sleeve until the nub engages the lower finger device 29. The other legs may then be thrust downwardly slightly until the foot of each of these other legs engages the floor at the same time the person setting up the apparel tree will position the post vertically, thus by having the sliding connection of the sleeve to the legs a slight adjustment may be made when a floor is uneven or slopes in one or more directions. The spacing bars 45 and straps 50 are sufficiently resilient to allow this slight vertical adjustment of the legs in relation to the sleeve 25. This construction therefore holds the sleeve stationary with the legs so that the post with its collars 15 and 17 may rotate on a vertical axis.

Another feature of my invention relates to a socket construction designated by the assembly numeral 60 (note particularly Figures 4 and 5). In this construction a sheet metal plate 61 is bent to form a shoulder 62 at the base and opposite side edges 63 and having an opening 64 at the top when the plate is secured to a flat surface indicated at 65, there being projecting tongues 66 through which attaching screws may be fitted. It is convenient to have the upper portion 12 of the poster stand formed with flat surfaces and thus to make it either for instance hexagonal or square in cross section.

A marcel type of spring 67 is fitted in the socket 68 formed by the outwardly bent or pressed plate. This spring is in the form of a strip indicated at 69 having a series of waves 70 and at the upper end there are slight diverging shoulders 71 which are preferably caught by the upper portion of side edges 63 before the plate forming the socket is secured to the upper part of the post or stand. This construction retains the marcel spring in close contact with a flat vertical face of the upper part of the post.

Therefore a bracket 75 which has a downturned plug 76 at the bottom may be supported in the socket, the plug fitting in front of the marcel spring and being confined by the face of the plate and the side edges if desired. These brackets may be a hat holder indicated at 77 or any other device for holding hats or garments, in fact brackets specially designed to hold different articles of apparel may be mounted in the same type of sockets in which sockets the marcel springs always cause the plugs to have a snug and tight fit.

Various changes may be made in the details of the construction without departing from the spirit or scope of the invention as defined by the appended claims.

I claim:

1. An apparel tree having a vertical post, a pair of collars rigidly secured at the lower end thereof, each collar having an offset rim and a shoulder with an annular space between the rim and the post, a sleeve having its upper and lower ends engaged inside of the said rims and in the said annular spaces, supporting legs, means for connecting the supporting legs to the sleeve, the said sleeve being held stationary relative to the legs and the said post being rotatable on a vertical axis in relation to the sleeve and hence of the legs, the means connecting the sleeve and the legs comprising interfitting guide devices for permitting a longitudinal movement of the legs in reference to the sleeve, means to limit the downward movement of the sleeve in reference to the legs, the longitudinal adjustment permitting the legs to support the post on a sloping surface with the post vertical.

2. An apparel tree having a vertical post, a pair of collars rigidly secured at the lower end thereof, each collar having an offset rim and a shoulder with an annular space between the rim and the post, a sleeve having its upper and lower ends engaged inside of the said rims and in the said annular spaces, supporting legs, means for connecting the supporting legs to the sleeve, the said sleeve being held stationary relative to the legs and the said post being rotatable on a vertical axis in relation to the sleeve and hence of the legs, the means to connect the sleeve and the legs comprising interfitting projecting guides and groove structure for longitudinal adjustment of the legs and space bars interconnecting each of the legs to retain the legs at the desired angle one to the other, the said spacing bars being resilient to permit adjustment of one or more legs longitudinally the post in reference to the remaining legs.

3. An apparel tree having a plurality of legs, a sleeve, an interfitting projecting guide and groove structure interconnecting the sleeve and the legs whereby the sleeve may slide longitudinally in reference to the legs, means to limit the downward movement of the sleeve in reference to each leg, the said sleeve having cylindrical upper and lower ends, a post having upper and lower collars connected thereto, the collars having an offset rim with a shoulder, the ends of the sleeve fitting inside of the rims to engage the shoulders whereby the post may rotate relative to the sleeve.

4. An apparel tree as described in claim 3, the guide and groove structure connecting the sleeve and the legs including guide fingers extending outwardly from the sleeve, a guide strip on each of the legs having an inwardly bent marginal edge with a space therebetween to accommodate the guide fingers, the legs with the guide strips being entirely removable from the guide fingers of the sleeve.

5. An apparel tree as described in claim 3, the interfitting means between the sleeve and the legs including the sleeve, being formed of metal and having slit portions with outwardly pressed guide fingers having edges parallel to the axis of the post, the legs each having a metal guide strip with inwardly turned marginal edges forming a space therebetween the said fingers, being insertable at one end of the guide strips whereby the legs may be completely disassembled from the sleeve.

6. An apparel tree as described in claim 3, spacing bars connecting adjacent legs, each bar having a horizontal portion with vertical ends, the legs having sockets in which the said ends are inserted and spacing straps formed of resilient metal adjustably mounted on the horizontal portion of the spacing bars, the said spacing straps being disconnectible from the spacing bars and the spacing bars disconnectible from the legs.

LEON COHEN.